July 9, 1946.　　　　N. W. ADOLPH　　　　2,403,839
COUPLING
Filed May 19, 1943　　　　2 Sheets-Sheet 1
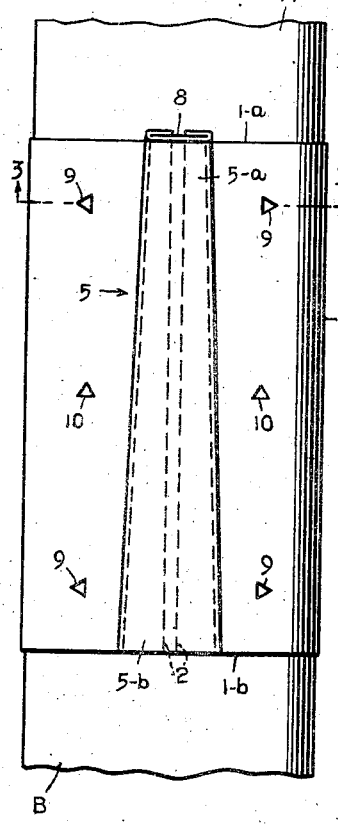
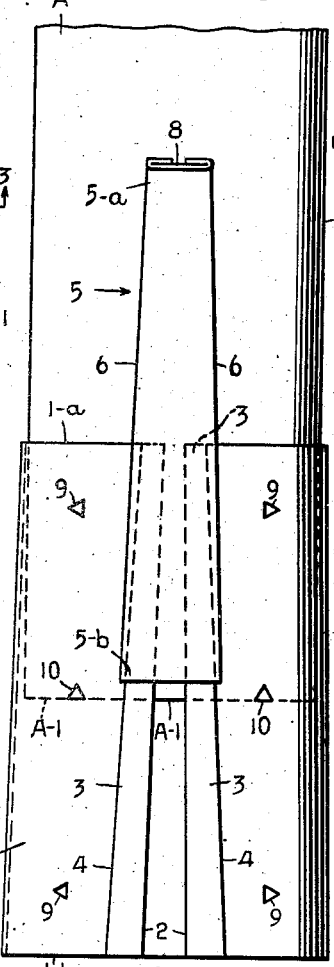
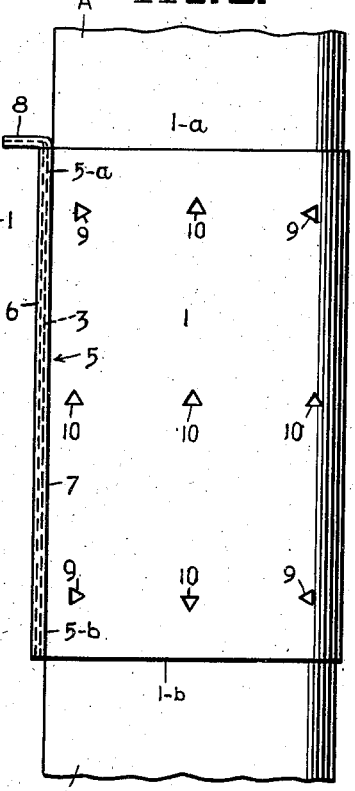
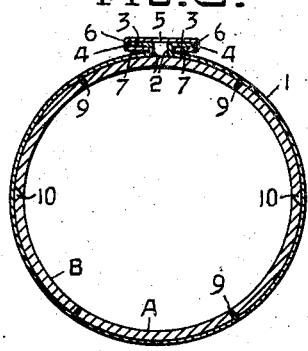
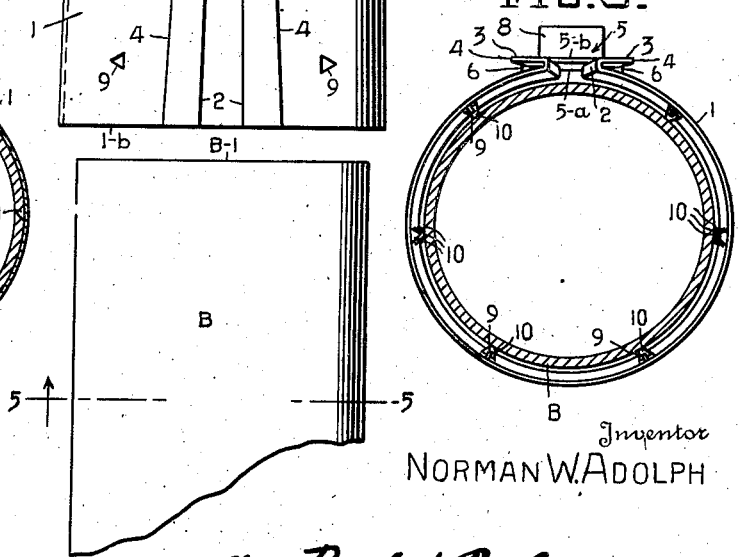
Inventor
NORMAN W. ADOLPH
By Beale & Park
Attorneys July 9, 1946.  N. W. ADOLPH  2,403,839
COUPLING
Filed May 19, 1943  2 Sheets-Sheet 2

Inventor
NORMAN W. ADOLPH
By Beale & Park
Attorneys

Patented July 9, 1946

2,403,839

UNITED STATES PATENT OFFICE 2,403,839

COUPLING

Norman W. Adolph, Grafton, Ill., assignor to Illinois Powder Manufacturing Company, St. Louis, Mo., a corporation of Illinois Application May 19, 1943, Serial No. 487,638

1 Claim. (Cl. 285—193)

My invention consists in a new and useful improvement in couplings and is designed to provide means for connecting rods, tubes, etc., in such a way as to firmly relate the elements to prevent endwise or rotative relative movement thereof, and is particularly intended for connecting two or more tubes of explosives which are to be inserted into a bore. In the use of a series of these explosive tubes, it is often necessary to work the tubes up and down in the bore to cause them to pass downwardly therethrough, and such reciprocation obviously imposes a very severe strain upon the coupling means connecting the several tubes in the series. It is to insure a reliable connection, to prevent any relative endwise or rotative movement of the several tubes, which is the purpose of my invention. The device comprises only two parts, a compressible, expansible collar to embrace the abutting ends of a pair of tubes, and a locking member to rigidly attach the collar to the tubes. The particularly novel and useful features of the invention are the inclined adjacent edges of the collar and the inclined flanges of the locking member which co-act in a wedging action to clamp the collar in position on the tubes, and a series of fangs on the inner surface of the collar which bite into the material of the tubes, when the collar is clamped thereon, to insure relative immobility of the collar and the tubes.

I have illustrated in the drawings filed herewith, and have hereinafter fully described certain specific embodiments of my invention, but it is to be distinctly understood that I do not consider my invention to be limited to said specific embodiments, but refer for its scope to the claim appended hereto.

In the drawings:

Fig. 1 is a front elevation of my improved coupling, showing it fully applied to a pair of tubes.

Fig. 2 is a side elevation.

Fig. 3 is a horizontal section on the line 3—3 of Fig. 1.

Fig. 4 is a front elevation, showing the coupling in the process of application to the tubes.

Fig. 5 is a horizontal section on the line 5—5 of Fig. 4.

Figure 8:
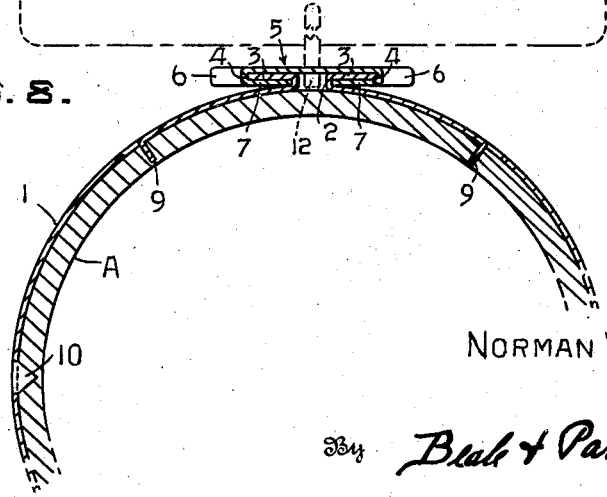
Fig. 8 is an enlarged, fragmentary, horizontal section on the line 8—8 of Fig. 6.

As illustrated in the drawings, the preferred form of the device, shown in Figs. 1 to 5, comprises the compressible, expansible collar 1 consisting of a single piece of suitable resilient material forming, when compressed, a cylindrical member having such an interior diameter that the tubes A and B, to be joined, are tightly gripped thereby. The abutting longitudinal edges 2 of the member 1 are bent upon themselves to form flanges 3 (Fig. 3) which have inclined oppositely disposed outer edges 4 spaced from the outer surface of the member 1. The locking member 5 has its longitudinal outer edges 6 formed with an inclination corresponding with that of the edges 4 of the flanges 3, and provided with inwardly turned flanges 7. The locking member 5 has a portion 8, at its narrower end 5—a, bent at an angle of 90° to the rest of the member 5, to provide an operating handle. The collar 1 is provided with sets of struck-up fangs extending inwardly from the inner surface of the collar 1, for engagement with the tubes A and B. A series of these fangs is provided circumferentially of the collar 1 adjacent each of its ends 1—a and 1—b. These end series comprise fangs 9 and 10, the former lying in planes parallel with the longitudinal axis of collar 1, and the latter in a plane parallel to the transverse axis of the collar 1 (Figs. 3, 5 and 8). A third series, composed entirely of fangs 10, is circumferentially disposed equidistant from the ends 1—a and 1—b. The reason for the peculiar character and disposition of these fangs 9 and 10 will presently appear.

Figure 6:
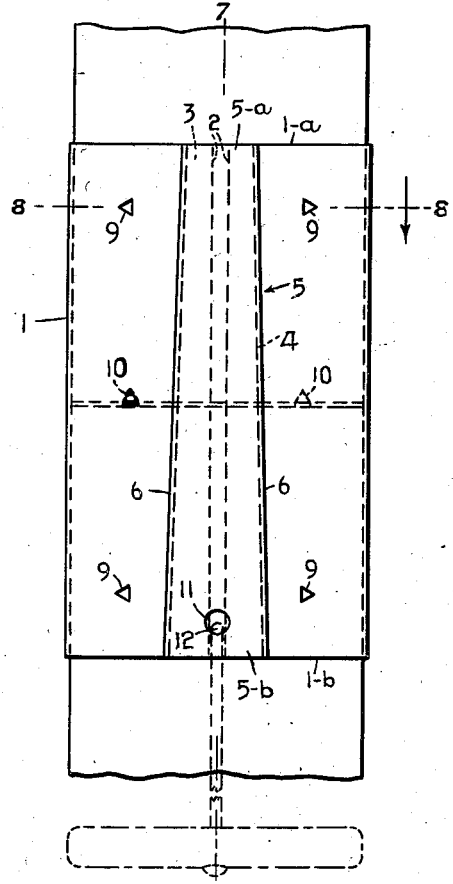
Fig. 6 is a front elevation, similar to Fig. 1, showing a modified form of coupling.
Figure 7:
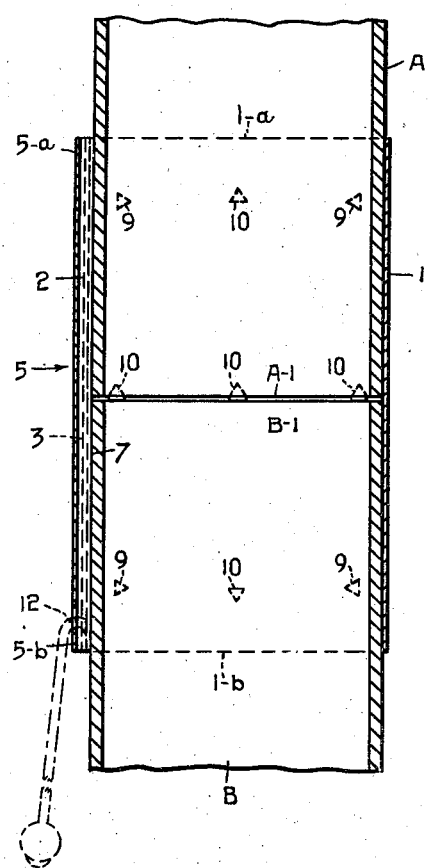
Fig. 7 is a vertical section on the line 7—7 of Fig. 6.

In the modified form of the device, illustrated in Figs. 6, 7 and 8, the handle 8 is dispensed with and the locking member 5 is provided with a suitable orifice 11 adjacent its end 5—b. With the form of the device, so illustrated in Figs. 6, 7 and 8, the locking member 5 can be drawn into locking position by any suitable form of hook 12 inserted into the orifice 11.

From the foregoing description of the details of construction of the device, its operation will be obvious. When it is desired to connect the tubes A and B by the improved coupling, the end A—1 of the tube A is inserted into the end 1—a of the collar 1 (Fig. 4) until the end A—1 is received on the upper faces of the fangs 10 at the middle of the member 1 which thus serve as stops to properly relate the tube A and member 1 so that the upper half of the member 1 embraces the tube A. The locking member 5 is then applied to the collar 1 by passing its end 5—b over the flanges 3 at the end 1—a of the collar 1. It is to be noted that the turned-over inclined edges 6 of the member 5 are most widely spaced at the end 5—b, and the inclined edges 4 of the flanges 3 are least widely spaced at the end 1—a. This relation of the parts thus facilitates the application of the locking member 5 to the collar 1, as above described. When the member 5 has been passed along the collar 1 for a distance sufficient to compress the collar 1 to cause the fangs 9 and 10 adjacent the end 1—a of member 1 to engage the tube A, to stabilize the collar 1 upon the tube A, the tube B is inserted into the lower end 1—b of collar 1, its end B—1 passing upwardly through the open end 1—b, until the end B—1 is received against the lower faces of the fangs 10 at the middle of the collar 1 serving as stops to properly relate the tube B to the collar 1 and consequently to the tube A already positioned in collar 1, so that the lower half of the collar 1 embraces the tube B. Thus it is obvious that the coupling is symmetrically disposed with relation to the tubes A and B. The locking member 5 is then forced downwardly from the position illustrated in Fig. 4 to that illustrated in Fig. 1, the wedging effect of the edges 6 of member 5 and the edges 4 of collar 1 thereby tightening the collar about the tubes A and B and causing the fangs 9 and 10 adjacent the ends 1—a and 1—b to penetrate the tubes A and B respectively. The disposition of the fangs 9 prevents rotation of the tubes A and B relative to the collar 1 and the disposition of the fangs 10 prevents relative end-wise movement of the tubes A and B and the collar 1.

It is obvious that the above described application of the coupling to the tubes may be performed with the modified form of the device, illustrated in Figs. 6, 7 and 8, by the use of the tool 12 inserted into the orifice 11, instead of the use of the turned over portion 8 of the preferred form.

Having described my invention, what I claim is:

In a coupling for connecting two endwise abutting tubes of opaque material, the combination of an expansible, compressible collar adapted to embrace the abutting ends of the tubes, said collar being provided with means whereby relative rotation of the collar and tubes is prevented, comprising a plurality of inwardly turned fangs disposed on the inner surface of the collar and lying in planes parallel with the longitudinal axis of the collar, and further provided with means whereby relative axial movement of the collar and tubes is prevented, comprising a plurality of inwardly turned fangs disposed on the inner surface of the collar and lying in planes parallel with the transverse axis of the collar, and further provided with means whereby the transverse axis of the collar may be positioned to coincide with the transverse plane passing between the abutting ends of the tubes, when the collar is applied to connect the tubes, comprising a plurality of inwardly turned fangs disposed on the inner surface of the collar, on the transverse axis of the collar, and lying in the plane of said transverse axis; and a locking member adapted to engage the collar to compress it and project the fangs of the said first and second means to penetrate the tubes, and the fangs of the third means to pass between the tubes.

NORMAN W. ADOLPH.